(12) United States Patent
Sokolskiy et al.

(10) Patent No.: US 7,114,678 B2
(45) Date of Patent: Oct. 3, 2006

(54) FILM EXTRACTION APPARATUS AND METHOD UTILIZING A BI-STABLE FILM STRIPPER MECHANISM

(75) Inventors: Alexander Sokolskiy, East Longmeadow, MA (US); David J. Bassett, Ware, MA (US)

(73) Assignee: Eastman Kodak Company, Rochester, NY (US)

( * ) Notice: Subject to any disclaimer, the term of this patent is extended or adjusted under 35 U.S.C. 154(b) by 185 days.

(21) Appl. No.: 10/851,914

(22) Filed: May 21, 2004

(65) Prior Publication Data

US 2005/0258300 A1    Nov. 24, 2005

(51) Int. Cl.
*B65H 23/00* (2006.01)
(52) U.S. Cl. ............... 242/566; 242/562; 396/388
(58) Field of Classification Search ............ 242/566, 242/615, 615.3, 615.4, 332, 332.1, 562, 562.1; 396/388
See application file for complete search history.

(56) References Cited

U.S. PATENT DOCUMENTS 3,864,993 A * 2/1975 Hovind ............ 81/488
4,047,653 A * 9/1977 Starr ............ 226/92
4,074,870 A * 2/1978 Kaufman ............ 242/348.3
4,113,192 A * 9/1978 Osanai ............ 242/348.3
4,138,068 A * 2/1979 Kinoshita ............ 242/348.3
5,848,316 A * 12/1998 Clough ............ 396/612
6,149,321 A   11/2000 Nishibata et al.
6,805,501 B1 * 10/2004 Winberg et al. ............ 396/612
2003/0133710 A1   7/2003 Winberg et al.

* cited by examiner

*Primary Examiner*—Kathy Matecki
*Assistant Examiner*—Sang Kim
(74) *Attorney, Agent, or Firm*—David A. Novais; Kathleen Neuner Manne

(57) ABSTRACT

In a film extraction apparatus, a flexible stripper blade tongue is held in a relaxed condition with the tongue extending downwardly of the blade by a natural curvature in the tongue near the tongue's juncture with the remainder of the blade. Inducing stress in the blade to create a slight degree of curvature of the tongue forces the tongue into a longitudinally straight and stiffened condition allowing the tongue to be driven through the cartridge mouth. Relaxation of the stress on the blade returns the tongue into its normal, downwardly-extending condition with the end of the tongue resting on the outer layer of the film irrespective of the roll diameter. Presence of the stripper blade upper surface across the gap between the cartridge mouth and a following film channel serves to guide the film into the film channel during the film extraction procedure.

17 Claims, 10 Drawing Sheets

FILM EXTRACTION APPARATUS AND METHOD UTILIZING A BI-STABLE FILM STRIPPER MECHANISM

FIELD OF THE INVENTION

This invention relates to apparatus and method for extracting photographic film from a film cartridge and more specifically to such apparatus employing a novel arrangement that facilitates insertion of a film stripper finger into the film cartridge and enhances the function of the stripper finger in guiding film out of cartridge during the film extraction operation.

BACKGROUND OF THE INVENTION

Most photographic film cameras, particularly motor operated types, rewind the filmstrip entirely into the film cartridge at the conclusion of picture taking. With the growth of distributed photofinishing operations, e.g. one-hour minilab photofinishing processors, and particularly with the emergence of kiosk style photofinishing equipment, increasing attention has been directed to techniques for extracting exposed film from the film cartridge without destroying the cartridge in the process.

An early technique is found in U.S. Pat. No. 4,074,870 to Kaufman, which discloses the use of a pair of flexible metal blades inserted through the plush light block at the mouth of the cartridge, a longer upper blade and a shorter lower blade, the lower blade having a curved anterior end portion that forms a mouth between the upper and lower blades. Combined with synchronized rotation of the film core, reciprocal movement of the blades urges the film tongue between the upper and lower blades where it is captured and pulled out of the cartridge mouth by removal of the two blades. The efficacy of this arrangement depends heavily on the reliability of forcing the film tongue into engagement between the two blades and it has not been entirely successful.

U.S. Pat. No. 6,149,321 to Nishibata et al. represents a commercially available film extraction mechanism made by Noritsu Koki Co., Ltd., of Japan. With this tabletop apparatus, an operator positions the cartridge in a nest in such a way that a stubby, relatively stiff metal blade with a curved anterior end is forced into mouth of the cartridge for use in stripping the film tongue from the remainder of the roll in the cartridge. Upon actuation, a flexible metal blade with high friction strips on its flanks is inserted into the cartridge, using the stubby metal blade as a guide, and grips the film while subsequently being withdrawn from the cartridge. The curved anterior end of the stubby metal blade is intended to guide the film out of the cartridge. However, this guide blade is always at a fixed position in the cartridge and does not always reach to the outer layer of the film roll, the diameter of which is a function of the length of the film strip as determined by the number of exposures on the roll. As a consequence, the film tongue does not always engage the anterior end of the stubby metal blade thereby increasing the chance of failure in the extraction process. Only the tongue is extracted with this apparatus, being deposited in a collection chamber after it passes beyond the stubby metal blade. As such, the apparatus, by itself, is not usable when the entire film roll must be extracted. Moreover, since the cartridge is manually loaded into the nest and requires some manual intervention to ensure proper insertion of the stubby stripper blade into the cartridge mouth, it is not suitable for use by untrained consumers as would be the case for an in-store kiosk application.

Patent Application Publication U.S. 2003/0133710 A1 assigned to Eastman Kodak Company, assignee of the present invention, discloses a film extraction apparatus that utilizes a flexible, elongated film stripper finger 164 inserted into the film cartridge. The finger has a downwardly curved anterior end and the finger is inserted sufficiently far as to insure engagement of the stripper finger with the outer layer of the film roll regardless of the diameter of the roll. An extractor finger 171 with high friction flank surfaces is then inserted into the cartridge to engage and extract the film tongue as the extractor finger is withdrawn from the cartridge. The stripper finger serves to strip and separate the film tongue from the remainder of the film roll and to guide the tongue out of the mouth of the cartridge. While effective as a stripper and guide, insertion of the flat flexible stripper finger with its downwardly curved anterior end is not as reliable as one would like causing undesired jamming events during the insertion process.

SUMMARY OF THE INVENTION

In accordance with the invention, apparatus is provided for extracting photographic film from a film cartridge which comprises a film cartridge nest for holding the mouth of the film cartridge in a fixed position and a film extractor mechanism that includes an elongated flexible extractor blade having a friction material along at least one flank of a film-facing surface of the extractor blade and a film channel for receiving and translating film as it is extracted from the cartridge.

The apparatus also includes a film stripper mechanism comprising a flexible film stripper blade having an elongated tongue intended for insertion into the cartridge to enhance stripping of the outer layer or tongue of the film from the remainder of the film roll. In its normal, unstressed condition, the stripper blade, including the tongue, is flat in its transverse dimension. When in this unstressed condition, the forward portion of the tongue is curved downwardly in the longitudinal direction of the tongue. The film stripper mechanism also includes a stripper blade support structure and an actuator mechanism which is coupled to the stripper blade and which, when actuated, operates in cooperation with the stripper blade support structure to induce a stressed condition in the stripper blade in which the tongue is curved slightly in its transverse dimension causing the tongue to straighten and stiffen in its longitudinal direction. The film stripper mechanism further includes a drive mechanism for reciprocally translating the stripper mechanism toward and away from the cartridge nest.

The apparatus further includes a controller operatively coupled to the actuator mechanism for causing the actuator to induce the stress in the stripper blade prior to insertion of the tongue into the film cartridge and for removing the stressed condition in the stripper blade after insertion of the tongue into the cartridge. The controller is also coupled to the drive mechanism for translating the stripper blade forwardly to insert the straightened tongue into the cartridge and for stopping the forward translation with the unstressed tongue in the cartridge with its forward portion downwardly curved, and for subsequently translating the stripper blade rearwardly at the conclusion of film extraction to remove the tongue from the cartridge. The controller is further coupled to the film extractor mechanism for inserting and removing the extractor blade from the cartridge so as to extract film from the cartridge while the tongue is in the cartridge.

In one preferred embodiment of the invention, the stripper blade includes an aft portion from which the tongue extends, the aft portion having laterally extending wing portions. In this embodiment, the blade support structure includes a mandrel having a curved upper surface on which the blade is mounted with the wing portions being curved around and joined below the mandrel. The actuator is coupled to the juncture of the wing portions and is responsive to the controller to be drawn downwardly to induce the stressed condition in the blade which straightens and stiffens the tongue.

In another embodiment of the invention, the aft portion of the stripper blade is elongated with generally the same lateral dimension as the tongue with this aft portion being nested in a planar support structure, one or both sides of which movable to compress the sides of the blade's aft portion to effect the desired curvature and stiffening of the tongue for insertion into the film cartridge.

In another aspect of the invention, there is provided a method of extracting film from a film cartridge which comprises the steps of providing a flexible film stripper blade having an elongated tongue that is normally flat in transverse cross section and that normally extends downwardly in longitudinal cross section; stressing the tongue by introducing a degree of curvature in the transverse cross section of the tongue so as to straighten and stiffen the tongue; inserting the straightened tongue into the mouth of a film cartridge; and removing the stress on the curved tongue to allow the tongue to revert to its normal shape with the forward end of the curved forward portion resting on the outer layer of a roll of film in the cartridge. The method of the invention further includes the steps of providing a flexible, elongated film extraction blade having a friction surface along at least one flank of the extraction blade; inserting the extraction blade into the mouth of the film cartridge along the upper surface of the stripper blade tongue until the extraction blade engages the film in the cartridge; removing the extraction blade from the cartridge to extract the film along the upper surface of the stripper blade tongue; and, finally, removing the stripper tongue from the film cartridge.

Several advantages are apparent from this invention. The use of a flexible stripper blade with a downwardly extending elongated tongue portion is desirable to ensure that the forward end of the blade, once inserted into the film cartridge, will engage the outer layer of the film roll regardless of the length of the film strip in the cartridge. The simple expedient of stressing the stripper blade to create lateral curvature that straightens and stiffens the tongue overcomes the difficulty of inserting the normally flexible blade through the light blocking plush material at the mouth of the film cartridge. Moreover, the arrangement for stressing the blade, inserting the stiffened tongue into the cartridge and for relaxing the tongue after insertion lends itself to automated operation, obviating the need for manual intervention to ensure proper insertion of the stripper tongue. Such an arrangement is particularly useful in consumer-oriented film processing kiosks in which manual intervention by untrained consumers can be a serious problem for the desired success of the kiosks.

DETAILED DESCRIPTION OF THE INVENTION

Figure 1:
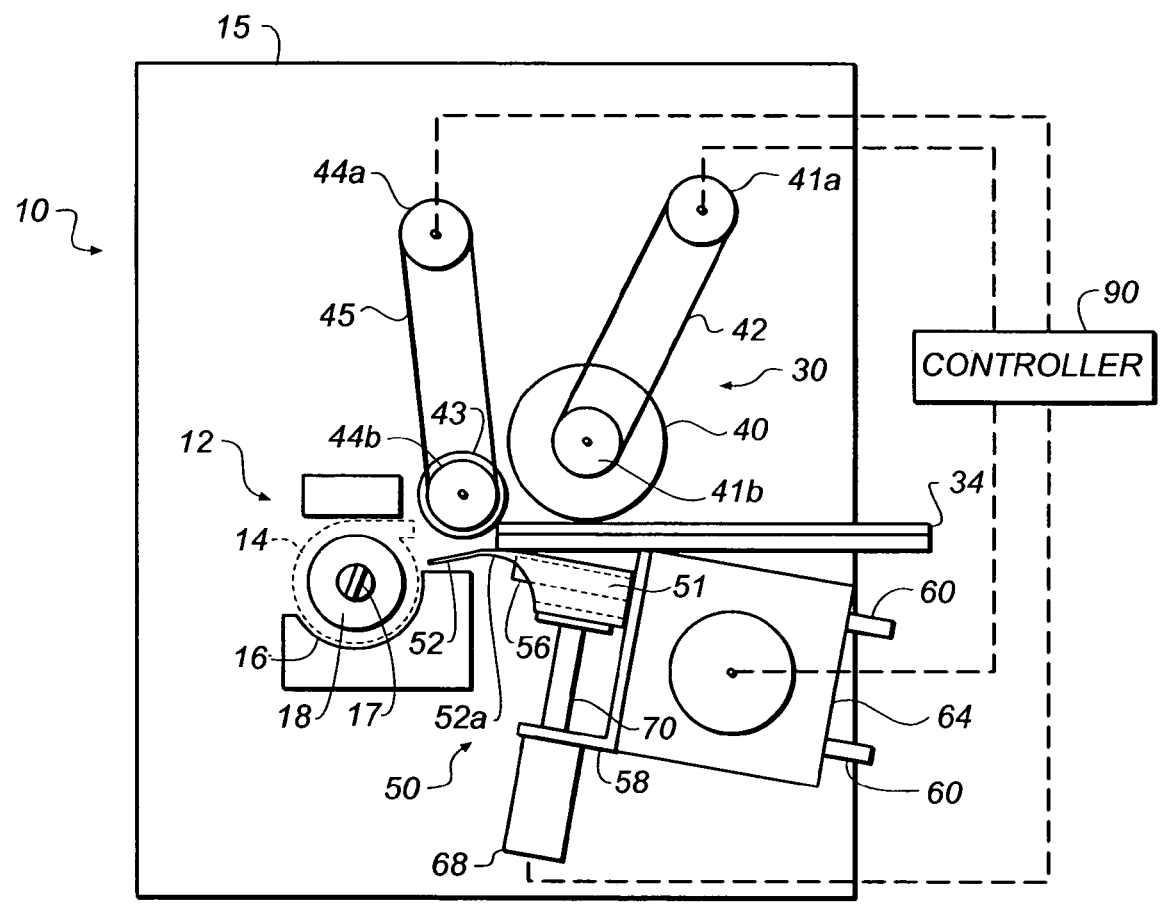
FIG. 1 is a side plan view of the film extraction apparatus of the invention.

Turning now to FIG. 1, in accordance with one aspect of the invention, film extraction apparatus 10 includes a film cartridge nest 12, a film extractor mechanism 30, and a film stripper mechanism 50, all mounted on a support wall plate 15. The extraction apparatus also includes a controller 90 for providing operational control of the components of the extraction apparatus. Cartridge nest 12 is provided with an elongated trough 16 and a cartridge transport device such as a rotatable magnetic cylinder 18 driven by a suitable drive motor (not shown) for reciprocal translation along the trough axis. A rotatable shaft tab 17, centrally positioned within the magnetic cylinder engages the spool of the film cartridge and is driven by a suitable drive motor (not shown) to rotate the film spool during the film extraction operation. A film cartridge 14 placed by a user at the entry of trough 16 is magnetically attached to the cylinder 18 and the axial cylinder drive motor is activated by controller 90 to pull the magnetic cylinder along the trough into a cylindrical sheath 19 (FIG. 7A) provided with a longitudinal slot 19a which serves to automatically position and hold the slotted mouth of the cartridge in proper orientation with the film extractor and stripper mechanisms during the film extraction operation.

Figure 2:
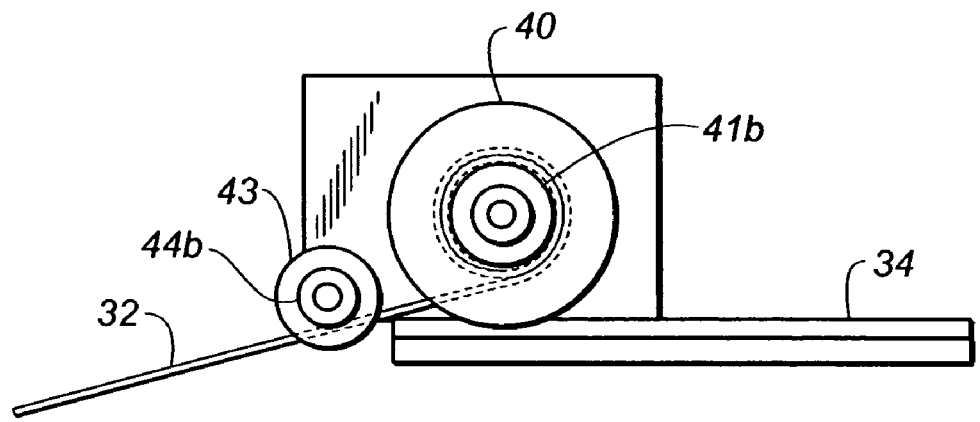
FIG. 2 is a side plan view of a film extractor mechanism useful in one aspect of the present invention.
Figure 3:
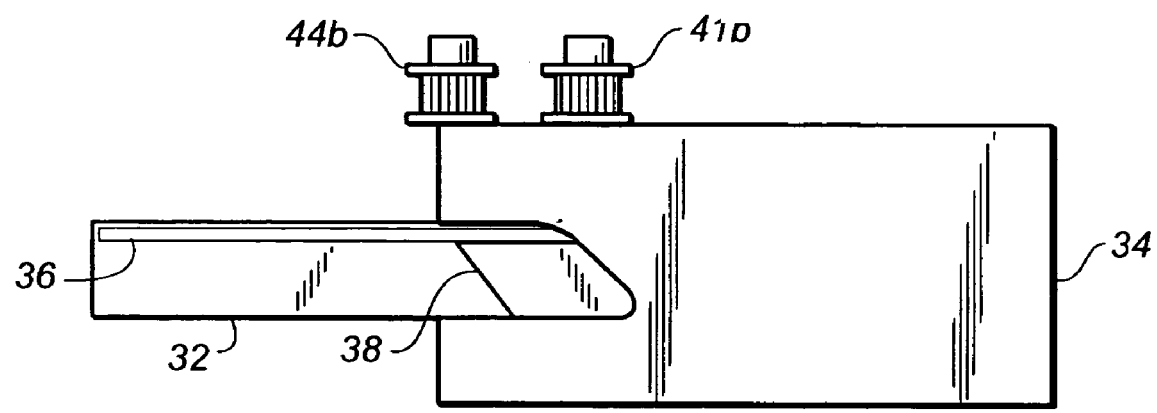
FIG. 3 is a plan view of the underside of the FIG. 2 extractor mechanism.
Figure 4:
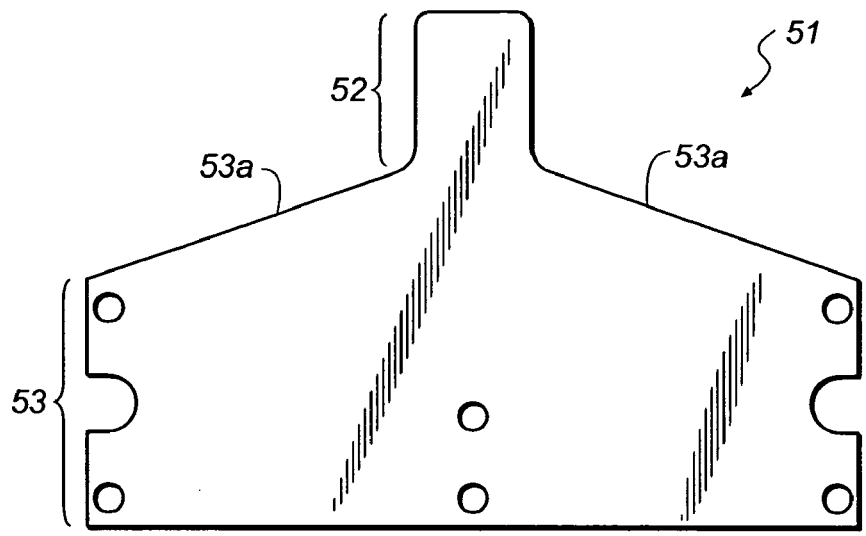
FIG. 4 is a top plan view of a stripper blade component useful in the stripper mechanism of FIGS. 6A and 6B.

Referring jointly to FIGS. 1–3, film extractor mechanism 30 includes an elongated flexible extractor blade 32 and a film channel 34 for receiving and translating film as it is extracted from the cartridge 14. As seen in FIG. 3, extractor blade 32 is preferably provided with a strip of a high friction material 36 extending along at least one flank of a film facing surface of the extractor blade. A skiving blade 38 is positioned in the film channel 34 in contact with the underside of extractor blade 32 and serves to separate the extracted film from the extractor blade as the flame is translated into and along the film channel 34. Extractor blade 32 is kept wound on a spool 40 which is driven by a controller operated motor drive (not shown), mounted on the reverse side of support wall plate 15, via drive pulleys 41a,b and timing belt 42. Extractor mechanism 30 additionally includes a film drive wheel 43 driven by a controller operated motor drive (not shown), similarly mounted on the reverse side of support wall 15, via drive pulleys 44a,b and timing belt 45.

In the preferred embodiment of the invention shown in FIG. 1, film extraction apparatus 10 is provided with a film stripper mechanism 50 which includes a flexible film stripper blade 51 preferably fabricated from a stainless steel sheet of approximately 0.03 inch thickness. Referring jointly to FIGS. 4 and 5A–C, stripper blade 51 is fabricated with an elongated tongue 52 and an aft portion 53 having laterally extending wing portions 53a. As fabricated, tongue 52 normally is generally flat in its transverse dimension and is formed with a natural curve 53a preferably located in the rear portion of the tongue near its juncture with the aft portion 53 of the stripper blade. When blade 51 is mounted in an unstressed manner on support structure, as described below, this natural curve allows the tongue to extend normally downwardly in relation to a film cartridge mounted in the cartridge nest 12. It should be noted that the term "downwardly" as used herein and in the appended claims, means in a radially inward direction from the outer circumference of the film cartridge toward the central core of the cartridge regardless of the orientation of the cartridge nest and cartridge therein and the term should be interpreted as having that meaning as used in this description and in the appended claims.

Referring now jointly to FIGS. 1, 4, 6A and 6B, stripper blade 52 is seen mounted on a support structure which includes a mandrel 56 having a laterally curved upper surface, an L-shaped bracket 58 and a pair of support shafts 60 translatably journalled by means of pistons 62 in a mounting block 64 which is secured to wall plate 15. When blade 52 is mounted on mandrel 56, wing portions 53 are wrapped around and secured beneath the mandrel by a pair of stiffener bars 72. At this point, the stripper blade is in an unstressed condition, as illustrated by the side view of the blade in FIG. 5A. In this condition, the transverse dimension of the blade and its tongue portion is generally flat with the front end portion of the tongue 52 extending downwardly by virtue of the natural curve 52a in the rear portion of the tongue. Stripper mechanism 50 further includes an actuator mechanism 66 comprised of a solenoid 68 and shaft 70 mounted on the bottom leg of bracket 58 and coupled to the stripper blade 52 by means of stiffener bars 72. This actuator mechanism, when actuated, is operative, in cooperation with mandrel 56, to induce a stressed, i.e. curved, condition in the stripper blade 52 by pulling the blade around the mandrel 56 with its bending axis perpendicular to the natural curve 52a of the tongue 52. This results in tongue 52 being curved slightly in its transverse dimension, as shown in FIG. 5C, causing the natural curve 52a to disappear thereby resulting in straightening and stiffening of the tongue in its longitudinal direction. This further results in the forward tip of the tongue to being moved to a predictable and repeatable location in front of the mouth of the film cartridge. The very slight curvature of the tongue needed to straighten and stiffen the tongue is insufficient to interfere with insertion of the tongue into the cartridge through the light blocking plush material at the mouth 14a of the cartridge.

The stripper mechanism also includes a drive mechanism, including drive motor 80, and a rack and pinion 81,82 connected to L-bracket 58, for reciprocally translating the stripper mechanism toward and away from the cartridge nest.

The film extraction apparatus also includes a controller 90, such as a suitably programmed microcontroller, which is operatively coupled to the actuator mechanism for causing solenoid 68 to pull down on the stripper blade wings, thereby inducing the stress in the blade that straightens and stiffens the tongue prior to insertion of the tongue into the film cartridge, and for removing the stress in the stripper blade after insertion of the tongue into the cartridge thereby allowing the natural curve 53 to extend the tongue downwardly once inside the cartridge. The controller is also coupled to the drive mechanism to effect translation of the stripper blade forwardly to insert the straightened tongue into the cartridge and to stop the forward translation with the unstressed tongue in the cartridge. According to a feature of the invention, the controller stops the forward translation of the stripper blade at a point at which the downwardly extending forward end of the tongue is in contact with the outer layer of film roll in the cartridge irrespective of the length of the film roll. Controller 90 is also coupled to the film extractor mechanism for inserting and removing the extractor blade from the cartridge so as to extract film tongue from the cartridge while the stripper tongue remains in the cartridge. Following removal of the extractor blade, film drive wheels 43 engage the film and continue to draw the remainder of the film out of the cartridge. It can be seen that the upper surface of the film stripper blade bridges the gap between the cartridge mouth and the entrance to the film channel 34 and thus serves the added beneficial function of guiding the forward end of the film tongue into the film channel entrance. At the conclusion of the film extraction, the controller reactivates the stripper drive mechanism to translate the stripper blade rearwardly to remove the stripper tongue from the cartridge. It will be appreciated that once the stress on the stripper blade is removed after the tongue is inserted into the film cartridge, the blade remains in the relaxed condition until a new extraction cycle is commenced.

Figure 7A:
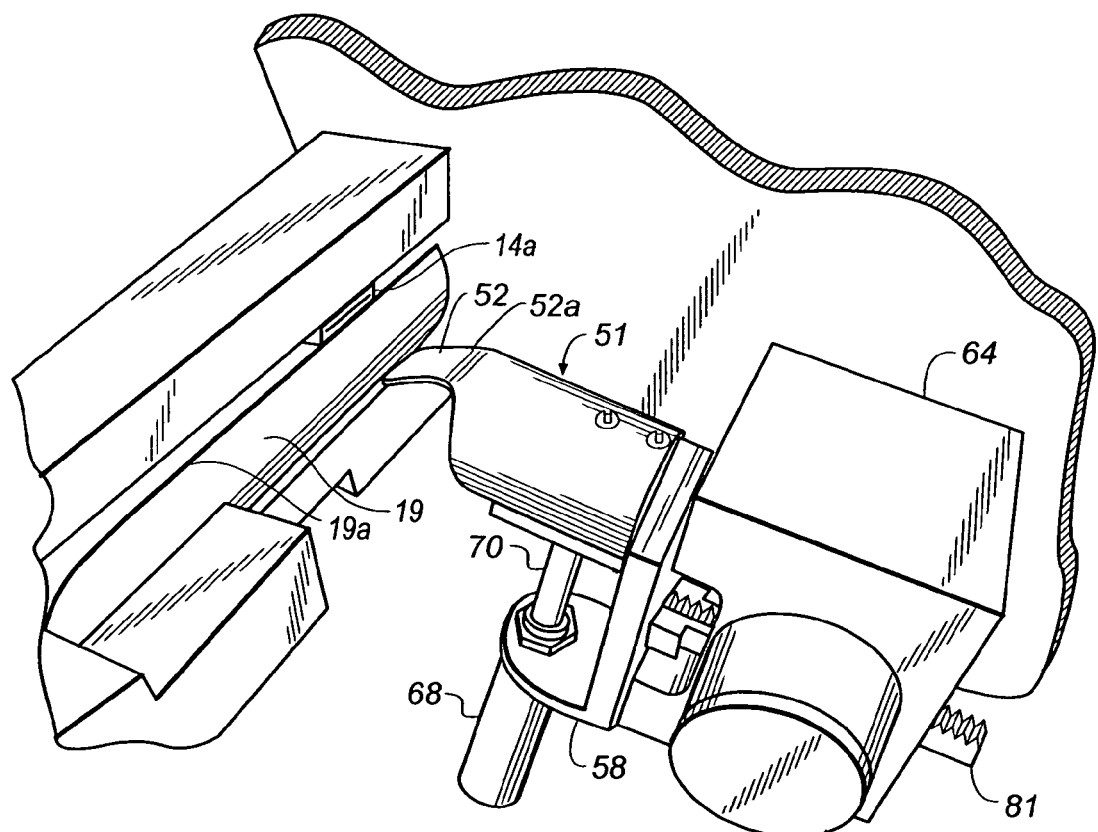
FIGS. 7A through 7C are perspective views of the stripper mechanism of FIGS. 4A and 4B illustrating different stages in the operation thereof.
Figure 7B:
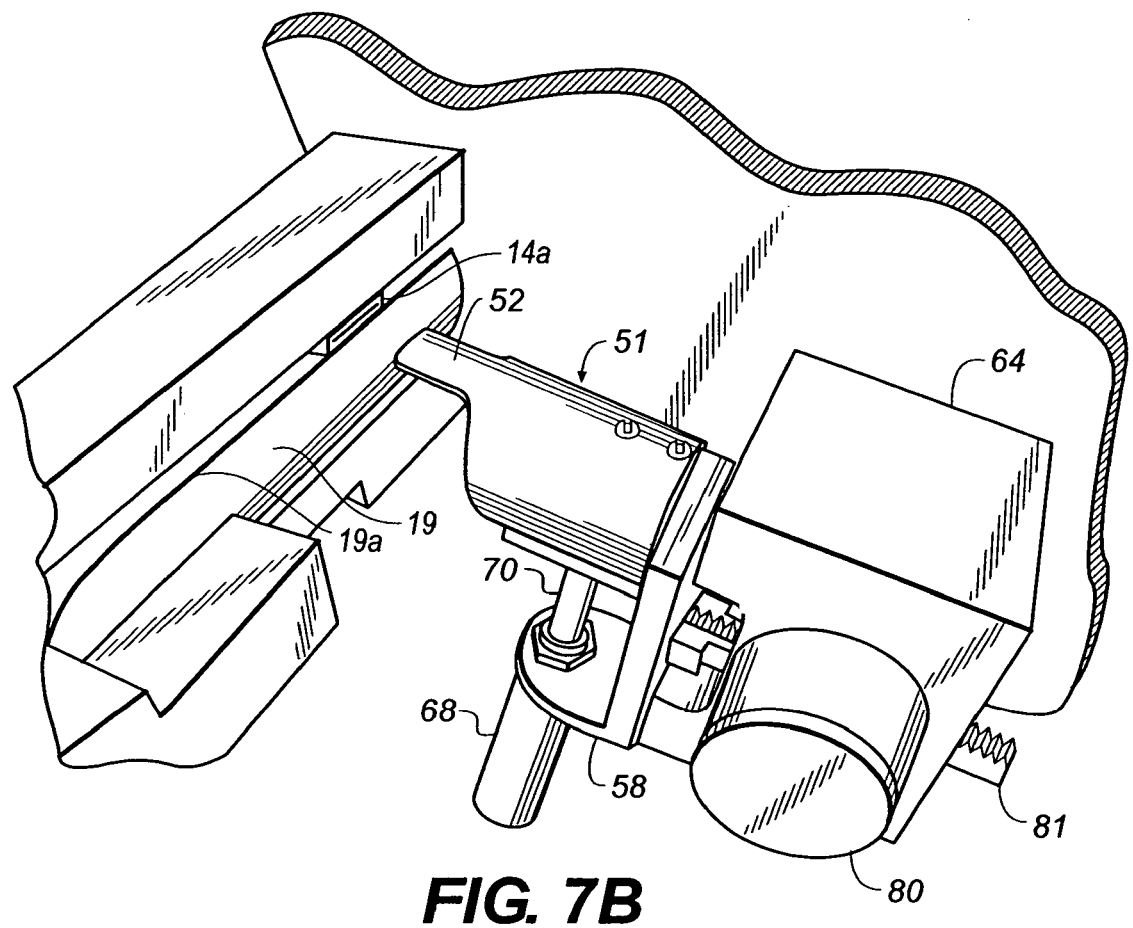
Figure 7C:
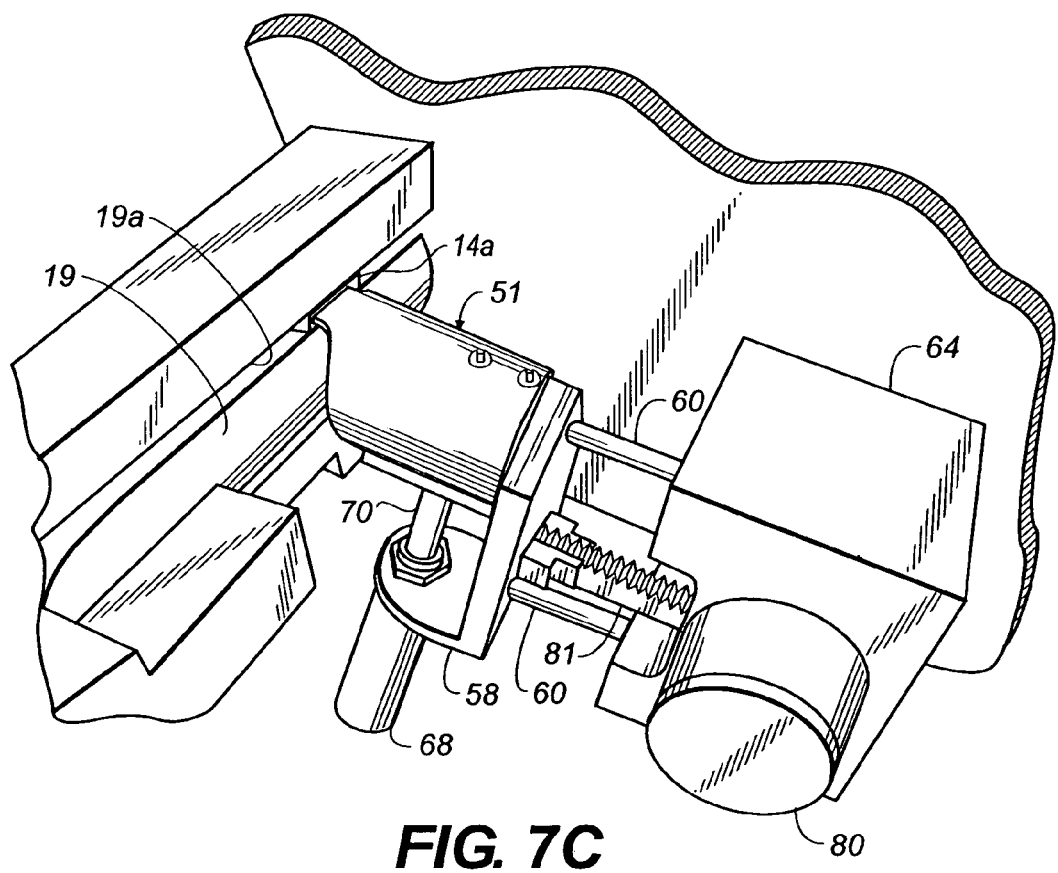

FIGS. 7A–7C illustrates three important phases in the operation of the film stripper mechanism in an actually constructed embodiment of the invention. In these figures, the extractor mechanism omitted for convenience in seeing the novel stripper mechanism itself. In FIG. 7A, the stripper blade is in its relaxed, unstressed condition. A film cartridge 14 is shown in position in the cartridge nest 12 with mouth 14a in position to receive the film stripper blade 51. Since blade 51 is unstressed at this point, tongue 52 extends downwardly below the mouth 14a of the cartridge due to the effect of the natural curve fabricated into the rear portion of the tongue. In FIG. 7B, the controller 90 has actuated solenoid 68 to draw down on the lateral wings 53a of the stripper blade causing a very slight curvature in the transverse direction of the tongue resulting in a straightening and stiffening of the tongue. At this point, the tongue is aligned with mouth 14a of the cartridge. In FIG. 7C, drive motor 80 has been activated by controller 90 to drive the stripper blade support structure forward, driving tongue 52 through cartridge mouth 14a into position within the cartridge.

Figure 8A:
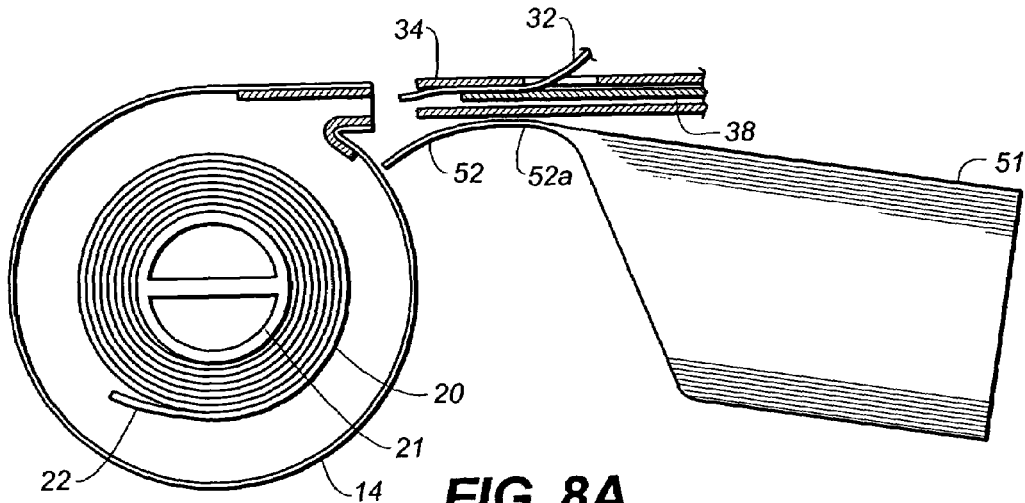
FIGS. 8A through 8E are side cross sectional views of a film cassette and portions of the extractor and stripper mechanisms of FIGS. 2 and 4A, 4B illustrating progressive stages in the film stripping and extraction operation of the present invention.

Referring now to FIGS. 8A–8E, steps in the method of the invention include providing a flexible film stripper blade 51 having an elongated tongue 52 that is normally flat in transverse cross section and that has a natural curve 52a in the longitudinal direction thereby extending the tongue downwardly, as viewed in FIG. 8A; and providing a flexible elongated film extraction blade 32 having a high friction surface along at least one flank of the extraction blade. The initial configuration of the extractor and stripper blades in FIG. 8A corresponds to the arrangement illustrated in FIG. 7A. Film cartridge 14 contains a roll of film 20 which is wound around a central core 21 and ends in a film tongue portion 22.

Figure 5A:
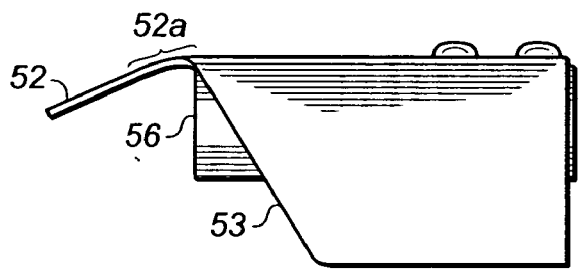
FIGS. 5A through 5C are schematic illustrations of the stripper blade of FIG. 4 useful in explaining the operation of the stripper mechanism of FIGS. 6A and 6B.
Figure 5B:
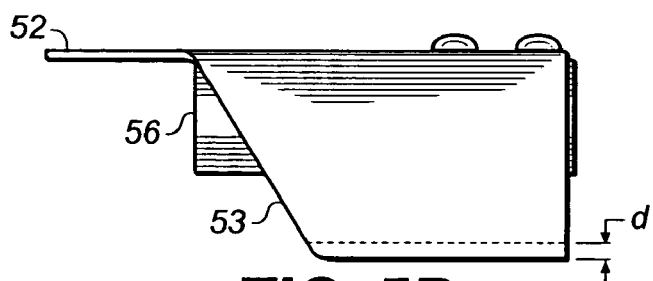
Figure 5C:
Figure 6A:
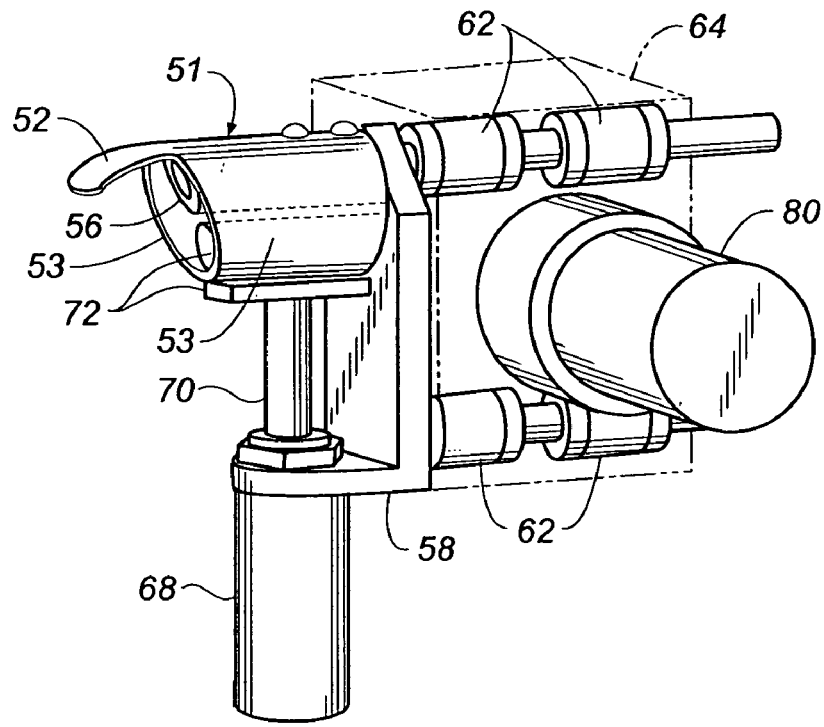
FIGS. 6A and 6B are opposite side perspective views of one embodiment of the film stripper mechanism of the present invention.
Figure 6B:
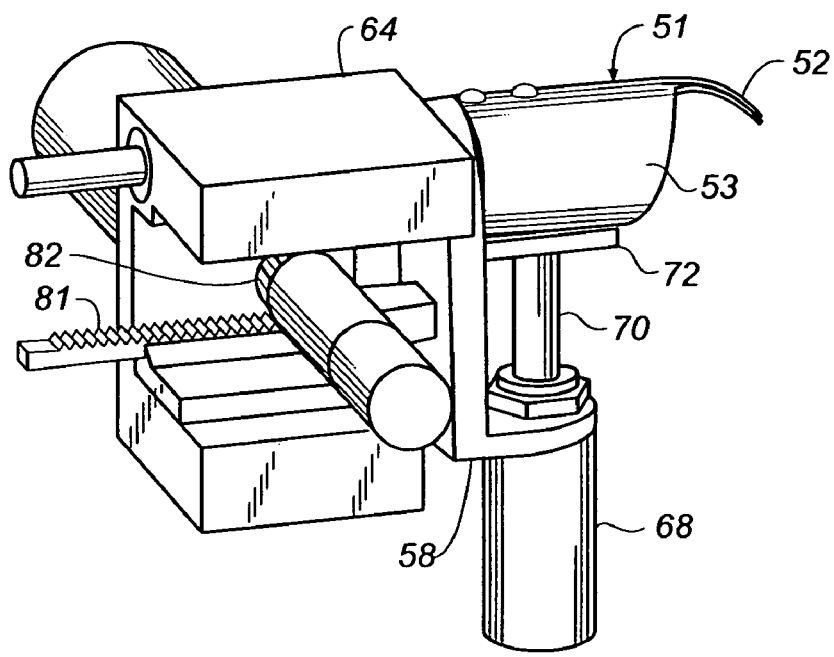
Figure 8B:
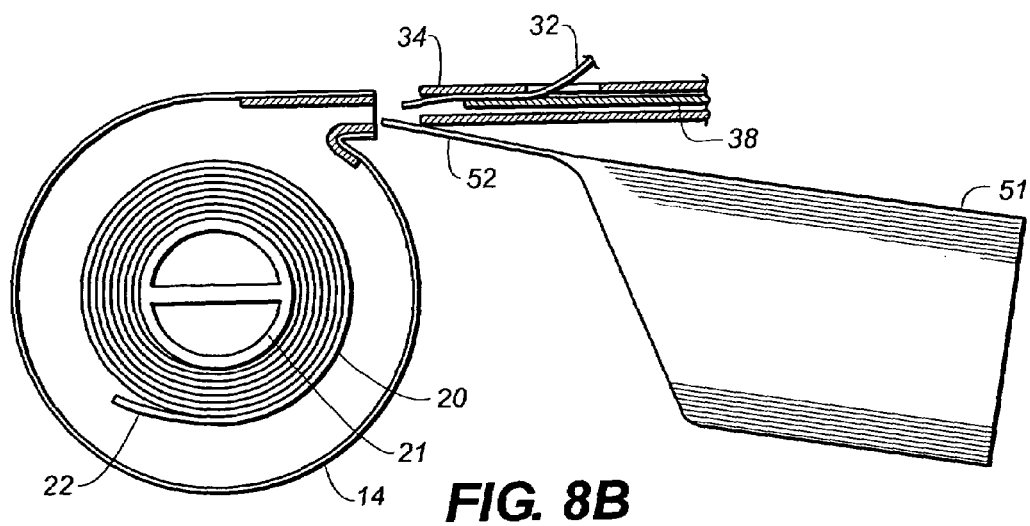
Figure 8C:
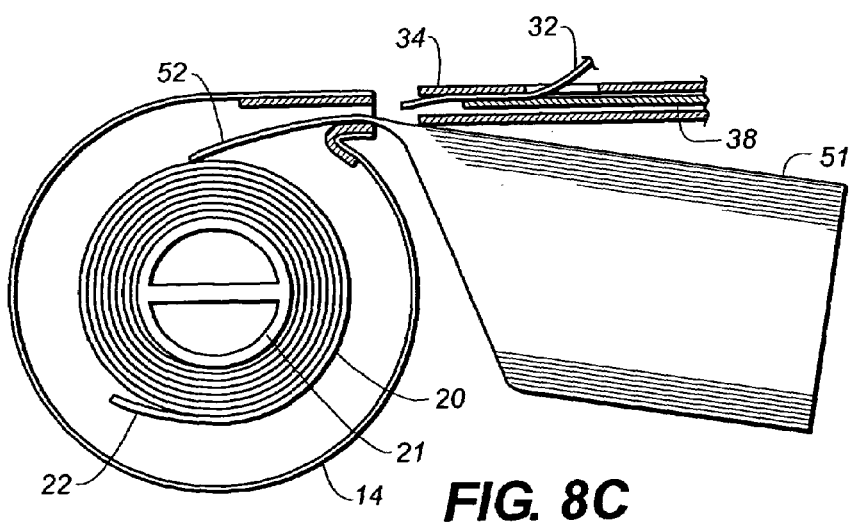

The method also includes stressing the stripper blade 51, by pulling the lateral wings down an amount "d" as seen in FIG. 5B, to introduce a degree of curvature in the transverse cross section of the tongue 52 thereby straightening and stiffening the tongue placing the tip of the tongue in a predictable and repeatable location in front of the mouth of the cartridge 11 as shown in FIG. 8B and in FIG. 7B. The stripper blade is then driven forward to insert the straightened tongue into the mouth of a film cartridge. Once the tongue 52 is fully inserted into the cartridge, the solenoid which has been pulling blade 51 over the mandrel 56 is deenergized to remove the stress on the stripper blade. This causes the stripper tongue 52 to relax allowing it to revert to its normal shape with the tongue extending downwardly inside the cartridge, i.e. radially toward the core 21 with the tip of the tongue 52 pressing against the outer layer of the film roll as shown in FIGS. 8C and 7C.

Figure 8D:
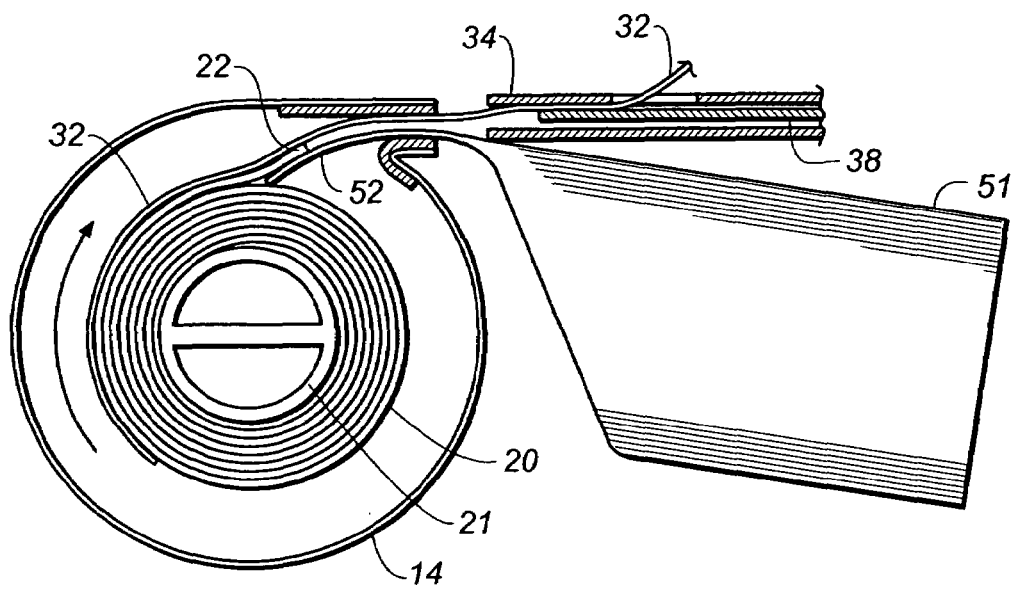
Figure 8E:
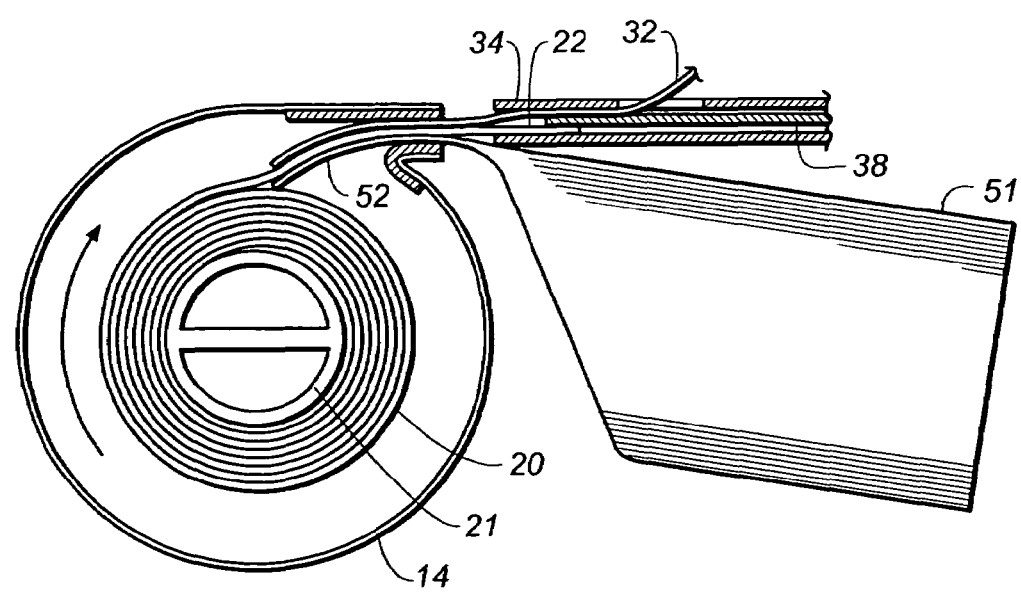

Once the stripper blade is in place, the steps of the method include inserting the extraction blade into the mouth of the film cartridge along the upper surface of the stripper blade tongue until the extraction blade engages the film in the cartridge. During this insertion operation, the core of the film roll preferably is rotated in a counterclockwise direction to permit the high friction surface on the extractor blade to engage the outer roll of the film while continuing its insertion which would otherwise be impeded since the high friction surface on the blade 52 prohibits sliding of the extractor blade on the surface of the film. As seen in FIG. 8D, the extractor blade is then pulled outwardly from the cartridge to extract the film tongue. Preferably, the core 21 is rotated clockwise at a rate that causes the rotational velocity of the outer roll of the film to be approximately the same as the extraction velocity of the extractor blade. During this phase, the film tongue 22 engages the forward tip of the stripper tongue 52 and is separated from the outer layer of the film roll. As the film tongue is pulled out of the film cartridge mouth, it is guided along the upper surface of stripper tongue 52 through the gap between the cartridge mouth 14a and the film channel 34 and thence into the entrance of the film channel 34. As seen in FIG. 8E, once inside the film channel, the film is separated from the high friction strip on the extractor tongue by skiving blade 38 allowing the film to be translated separately down the film channel to subsequent film handling equipment (not shown). Although not shown in FIG. 8E, film drive rollers 43 (FIG. 1) positioned at the entrance to film channel 34 are actuated to continue pulling the film from the cartridge after the extractor blade has been removed from the cartridge thereby continuing the withdrawal of the complete film roll from the cartridge and the translation thereof through the film channel In a presently preferred embodiment of the inventive method, the steps further include providing the stripper blade with an aft portion having laterally outwardly extending flank sides; mounting said aft portion with the extended flank sides curved around a mandrel having a curved surface in contact with the stripper blade; and stressing the stripper blade to induce transverse curvature of the tongue by pulling the extended flank sides of the stripper blade downwardly across the curved surface of the blade supporting mandrel. A subsidiary novel feature of the extraction method involves the step, during the film extraction phase of utilizing the upper surface of the film stripper blade to guide the extracted film into a film channel thereby allowing extraction of the entire roll of film from the cartridge; and continuing to extract film from the cartridge into the channel with film extraction drive rollers after the film extraction blade is removed from the cartridge, as described above.

Figure 9:
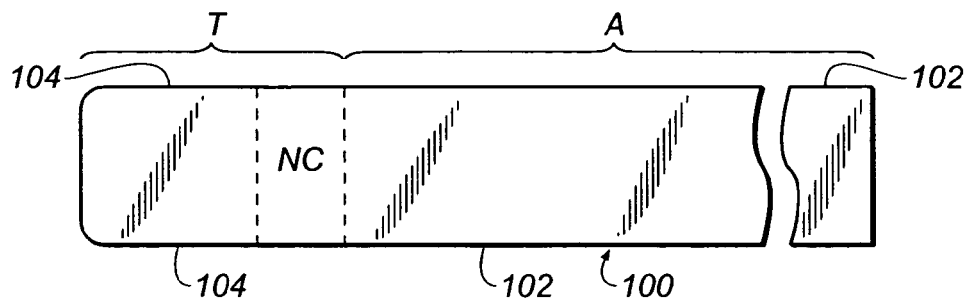
FIG. 9 is a front end view of an alternative embodiment of a film stripper mechanism according to the present invention.
Figure 10:
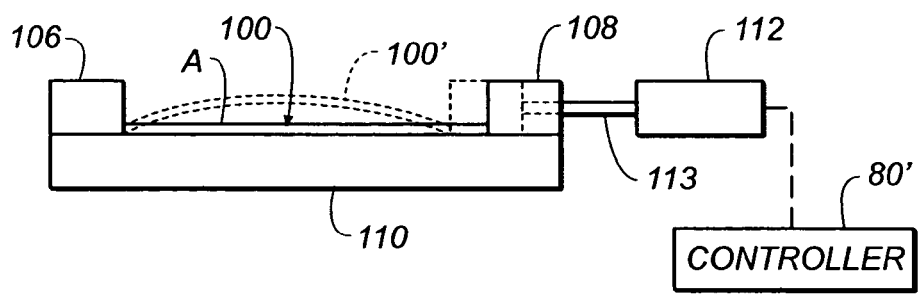
FIG. 10 is a front end view of another alternative embodiment of a film stripper mechanism of the present invention.
Figure 11:
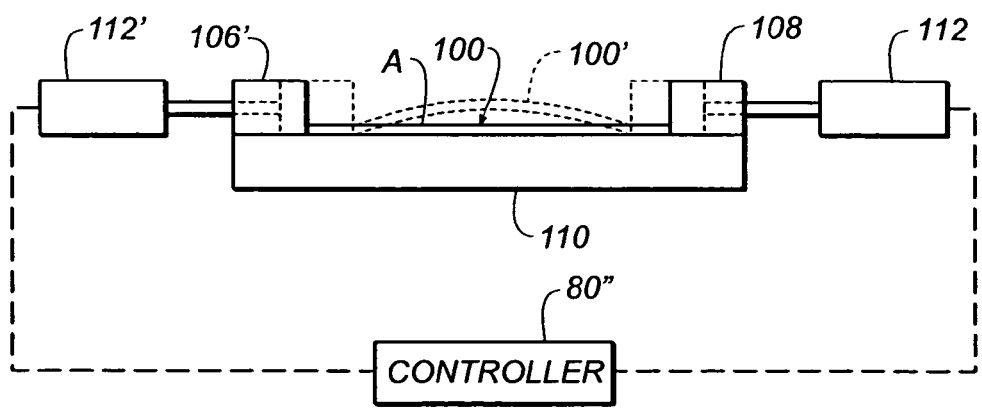
FIG. 11 is a front end view of another alterative embodiment of a film stripper mechanism of the present invention.

In FIG. 9, a modified form of film stripper blade 100 includes a tongue portion T and an extended aft portion A, the aft portion having longitudinally extending sides 102 generally, but not necessarily exactly, coextensive with sides 104 of the tongue portion. Like the stripper blade 51, a natural curve portion NC is formed during fabrication of the blade in the rear portion of the tongue T near its juncture with aft portion A. In FIG. 10 a stripper blade channel is shown in which the extended aft sides of blade 100 are captured between elongated raised sides 106,107 which are mounted on a base 110. In this embodiment, side 106 is fixed and side 108 is laterally movable in response to an actuator mechanism comprising solenoid 112 and link 113 under the control of controller 80'. With this arrangement, curvature of the tongue portion 2 is achieved by actuation of the solenoid to move side 108 by an amount sufficient to achieve the tongue curvature needed to realize the desired straightening and stiffening of the tongue. A rack and pinion drive mechanism (not shown) similar to that of FIG. 1 may be employed to the drive the stripper tongue into and out of the film cartridge. In FIG. 11, a stripper mechanism is shown in which both sides 106' and 108 are movable in response to an actuator mechanism including solenoids 112 and 112' to achieve the desired curvature in the stripper tongue portion.

The invention has been described in detail with particular reference to certain preferred embodiments thereof, but it will be understood that variations and modifications can be effected within the spirit and scope of the invention.

PARTS LIST 10. film extraction apparatus
12. film cartridge nest
14. film cartridge
15. support wall plate
16. trough
17. rotatable shaft tab
18. magnetic cylinder
19. cylindrical sheath
20. film roll
21. film cartridge core
22. film tongue
30. film extractor mechanism
32. extractor blade
34. film channel
36. friction material
38. skiving blade
40. extractor blade spool
41. drive pulleys
42. timing belt
43. film drive wheel
44. drive pulleys
45 timing belt
50. film stripper mechanism
51. film stripper blade
52. elongated tongue
52a natural curve in tongue
53. aft portion of stripper blade 51
53a lateral wings in aft portion
54. support structure
56. mandrel
58. L-shaped bracket
60. support shafts
62. pistons
64. mounting block
66. stripper actuator mechanism
68. solenoid 70. solenoid shaft
72. stiffener bars
74. stripper blade aft portion
76. stripper blade lateral wings
78. blade fasteners
80. drive motor
81, 82 rack and pinion
90. controller
100. modified stripper blade
102 aft sides of stripper blade 100
104 sides of tongue portion
106 fixed channel side
108 movable channel side
110 channel base
112 solenoid
113 solenoid link

The invention claimed is:

1. Apparatus for extracting photographic film from a film cartridge comprising:
   a) a film cartridge nest for holding the mouth of the film cartridge in a fixed position
   b) a film extractor mechanism including (i) an elongated flexible extractor blade having a friction material along at least one flank of a film-facing surface of the extractor blade and (ii) a film channel for receiving and translating film as it is extracted from the cartridge:
   c) a film stripper mechanism including
      (i) a flexible film stripper blade having an elongated tongue that, in an unstressed condition, is flat in its transverse dimension thereof, the tongue, in said unstressed condition, having a curved portion that extends the tongue downwardly in the longitudinal direction of the tongue;
      ii) a stripper blade support structure;
      iii) an actuator mechanism coupled to the stripper blade which when actuated, is operative in cooperation with the support structure, to induce a stressed condition in the stripper blade in which the tongue is curved slightly in its transverse dimension causing the tongue to straighten and stiffen in its longitudinal direction; and
      iv) a drive mechanism for reciprocally translating the film stripper blade toward and away from the cartridge nest; and
   d) a controller operatively coupled
      (i) to the actuator mechanism for causing said actuator to induce said stressed condition in the stripper blade prior to insertion of the tongue into the film cartridge and for removing said stressed condition in the stripper blade after insertion of the tongue into the cartridge;
      (ii) to the drive mechanism for translating the stripper blade forwardly to insert the straightened tongue into the cartridge and for stopping the forward translation with the unstressed tongue in the cartridge with its forward portion downwardly curved, and for subsequently translating the stripper blade rearwardly at the conclusion of film extraction to remove the tongue from the cartridge, and
      (iii) to the film extractor mechanism for inserting and removing the extractor blade from the cartridge so as to extract film from the cartridge while the tongue is in the cartridge.

2. The film extraction apparatus of claim 1, in which the controller stops the forward translation of the stripper blade at a point at which, after the stripper blade is relaxed, the forward end of the tongue is in contact with the outer layer of film roll in the cartridge irrespective of the length of the film roll.

3. The film extraction apparatus of claim 1, wherein said stripper blade includes an aft portion from which the tongue extends, the aft portion having laterally extending wing portions; the blade support structure includes a mandrel having a curved upper surface on which the blade is mounted with the wing portions being curved around and joined below the mandrel; and the actuator being coupled to the juncture of the wing portions and being responsive to the controller to be drawn downwardly to induce said stressed condition in the blade which straightens and stiffens the tongue.

4. The film extraction apparatus of claim 3, in which the drive mechanism includes a support frame, a drive motor and a rack and pinion drive coupled from the drive motor to the stripper support structure; and the mandrel includes an extension rod journalled in the drive support frame for longitudinal translation of the stripper blade to and from the film cartridge position.

5. The film extraction apparatus of claim 3, wherein said curved portion of the tongue is positioned toward the rear of the tongue near the juncture with the aft portion of the blade.

6. The film extraction apparatus of claim 3, wherein said film channel of the film extractor mechanism is positioned so as to be in alignment with the mouth of the film cartridge nested in its fixed position with a gap between the forward end of the film channel and the mouth of the film cartridge, and the film stripper mechanism is so positioned beneath the extractor film channel such that, when inserted into the film cartridge, the upper surface of the stripper tongue bridges the gap between the cartridge mouth and the film channel to provide a guide surface that guides insertion of the extractor blade into the film cartridge mouth and, upon extraction of the film, provides a guide surface that guides the tongue of the film into the film channel.

7. The film extraction apparatus of claim 3, in which the actuator mechanism includes a solenoid coupled to the stripper blade.

8. The film extraction apparatus of claim 1, wherein said curved portion of the tongue is positioned toward the rear of the tongue near the juncture with the aft portion of the blade.

9. The film extraction apparatus of claim 1, wherein said film channel of the film extractor mechanism is positioned so as to be in alignment with the mouth of the film cartridge nested in its fixed position with a gap between the forward end of the film channel and the mouth of the film cartridge, and the film stripper mechanism is so positioned beneath the extractor film channel such that, when inserted into the film cartridge, the upper surface of the stripper tongue bridges the gap between the cartridge mouth and the film channel to provide a guide surface that guides insertion of the extractor blade into the film cartridge mouth and, upon extraction of the film, provides a guide surface that guides the tongue of the film into the film channel.

10. The film extraction apparatus of claim 1, in which the actuator mechanism includes a solenoid coupled to the stripper blade.

11. The film extraction apparatus of claim 1, wherein the film stripper blade includes an extended aft portion having longitudinal sides and the film stripper blade mechanism further includes a stripper blade channel for capturing said extended aft portion of the blade, the channel having longitudinal sides that engage the longitudinal sides of the blade aft portion, at least one of said channel sides being laterally movable; and the actuator mechanism is coupled to the at least one movable side of the blade channel to induce curvature in the stripper blade by compressing the sides of the blade's extended aft portion.

12. The film extraction apparatus of claim 11, in which both sides of the channel are movable and the actuator is coupled to both movable sides to effect compression of the longitudinal sides of the blade's aft portion.

13. A method of extracting film from a film cartridge comprising the steps of:
  providing a flexible film stripper blade having an elongated tongue that is normally flat in transverse cross section and that has a natural curve in the longitudinal direction thereby extending the tongue downwardly;
  stressing the stripper blade to introduce a degree of curvature in the transverse cross section of the tongue thereby straightening and stiffening the tongue;
  inserting the straightened tongue into the mouth of the film cartridge;
  removing the stress on the stripper blade to allow the tongue to revert to its normal shape with the tongue extending downwardly inside the cartridge to rest on the outer layer of a roll of film in the cartridge;
  providing a flexible elongated film extraction blade having a friction surface along at least one flank of the extraction blade;
  inserting the extraction blade into the mouth of the film cartridge along the upper surface of the stripper blade tongue until the extraction blade engages the film in the cartridge;
  removing the extraction blade from the cartridge to extract the film along the upper surface of the stripper blade tongue; and
  removing the stripper tongue from the film cartridge.

14. The method of claim 13 wherein film, during extraction, is guided by the upper surface of the film stripper blade into a film channel allowing extraction of the entire roll of film from the cartridge; and continuing to extract film from the cartridge into the channel with film extraction drive rollers after the film extraction blade is removed from the cartridge.

15. The method of claim 13, wherein the stripper blade provided has an aft portion having laterally outwardly extending flank sides; mounting said aft portion with the extended flank sides curved around a mandrel having a curved surface in contact with the stripper blade; stressing the stripper blade to induce transverse curvature of the tongue by pulling the extended flank sides of the stripper blade downwardly across the curved surface of the blade supporting mandrel.

16. The method of claim 13, wherein the stripper blade has an aft portion with longitudinal sides extending rearwardly of the tongue; supporting the aft portion in a support channel having at least one movable side parallel with the longitudinal sides of the stripper blade; and stressing the stripper blade by moving said at least one movable side to apply pressure on the sides of the aft portion of the stripper blade to induce a degree of curvature in the tongue with resultant straightening and stiffening of the tongue.

17. The method of claim 13, wherein the stripper blade has an aft portion with longitudinal sides extending rearwardly of the tongue; supporting the aft portion in a support channel having two movable sides parallel to the flank sides of the stripper blade and stressing the stripper blade by moving both sides of the support channel to apply pressure simultaneously to both longitudinal sides of the aft portion of the stripper blade to induce curvature of the tongue with resultant straightening and stiffening of the tongue.

* * * * *